United States Patent [19]

Steiger et al.

[11] Patent Number: 5,576,401
[45] Date of Patent: Nov. 19, 1996

[54] PROCESS FOR THE PRODUCTION OF GEL-FREE ETHYLENE/VINYL ACETATE COPOLYMERS WITH A HIGH CONTENT OF COPOLYMERIZED VINYL ACETATE AND A HIGH MOONEY VISCOSITY

[75] Inventors: Roland Steiger, Dormagen; Erhard Asch, Köln; Wolfgang Baade, Dormagen; Werner Obrecht, Moers, all of Germany

[73] Assignee: Bayer Aktiengesellschaft, Leverkusen, Germany

[21] Appl. No.: 545,375

[22] Filed: Oct. 19, 1995

Related U.S. Application Data

[63] Continuation of Ser. No. 262,484, Jun. 20, 1994, abandoned.

[30] Foreign Application Priority Data

Jun. 30, 1993 [DE] Germany ............. 43 21 764.8

[51] Int. Cl.⁶ ................................................ C08F 2/06
[52] U.S. Cl. ..................... 526/65; 526/212; 526/331
[58] Field of Search ......................... 526/65, 212, 331

[56] References Cited

U.S. PATENT DOCUMENTS 4,937,303  6/1990  Wolf et al. .................. 526/330
5,093,450  3/1992  Baade et al. ................ 526/323.2

FOREIGN PATENT DOCUMENTS 0307755  3/1989  European Pat. Off. .
0341499  11/1989  European Pat. Off. .
0510478  10/1992  European Pat. Off. .
3825450  1/1990  Germany .

Primary Examiner—Thomas R. Weber
Attorney, Agent, or Firm—Connolly & Hutz

[57] ABSTRACT

Gel-free ethylene/vinyl acetate copolymers with a high content of copolymerized vinyl acetate and a high Mooney viscosity are produced by carrying out the polymerization in solution in the presence of 20 to 45% by weight tert.butanol, based on the reaction solution, at temperatures of 50° to 80° C. and under pressures of 300 to 450 bar using azo compounds in a cascade of stirred reactors with an average residence time of the reaction solution in the reactor cascade of 5 to 9 hours and a conversion of 50 to 70% by weight, based on the vinyl acetate used. The ethylene/vinyl acetate copolymers produced by the process according to the invention may be used for the production of vulcanizates having improved mechanical properties.

3 Claims, No Drawings

PROCESS FOR THE PRODUCTION OF GEL-FREE ETHYLENE/VINYL ACETATE COPOLYMERS WITH A HIGH CONTENT OF COPOLYMERIZED VINYL ACETATE AND A HIGH MOONEY VISCOSITY

This application is a continuation of application Ser. No. 08/262,484 filed on Jun. 20, 1994, now abandoned.

This invention relates to a process for the production of gel-free ethylene/vinyl acetate copolymers with a high content of copolymerized vinyl acetate and a high Mooney viscosity and to the use of the gel-free ethylene/vinyl acetate copolymers for the production of vulcanizates having improved mechanical properties.

U.S. Pat. No. 4,485,225 (DE 32 28 169) and EP 136 559 describe processes for the copolymerization of ethylene and vinyl acetate which are carried out in the presence of a radical initiator and in the presence of a solvent. The ethylene/vinyl acetate copolymers produced in accordance with U.S. Pat. No. 4,485,225 or rather the vulcanizates produced from them have unsatisfactory mechanical properties. In addition, the volume/time yield of the process described in U.S. Pat. No. 4,485,225 is unsatisfactory. An unsatisfactory volume-time yield is also obtained in the process for the production of ethylene/vinyl acetate copolymers which is described in European patent application 136 559.

European patent application 374 660 describes a process for the production of ethylene/vinyl acetate copolymers showing high tensile strength. The high tensile strength of the copolymers is achieved by copolymerizing small quantities of acryloyl or methacryloyl compounds additional to ethylene and vinylacetate. The disadvantage of the process described in European patent application 374 660 lies in the use of the acryloyl or methacryloyl compounds mentioned which lead to a poor volume/time yield in the copolymerization. In addition, the process is complicated by the handling of additional monomers.

European patent application 307 755 also describes a process for the production of ethylene/vinyl acetate copolymers of high molecular weight and low gel content. The ethylene/vinyl acetate copolymers obtained by this process or rather the vulcanizates produced from them are still in need of improvement in regard to their mechanical properties, such as tensile strength, elongation at break, modulus, compression set and tear propagation resistance.

A process for the production of gel-free ethylene/vinyl acetate copolymers with a high content of copolymerized vinyl acetate and a high Mooney viscosity has now been found and is characterized in that the polymerization is carried out in solution in the presence of 20 to 45% by weight tert.butanol, based on the reaction solution, at temperatures of 50° to 80° C. and under pressures of 300 to 450 bar using azo compounds in a cascade of stirred reactors with an average residence time of the reaction solution in the reactor cascade of 5 to 9 hours and a conversion of 50 to 70% by weight, based on the vinyl acetate used.

The ethylene/vinyl acetate copolymers produced by the process according to the invention are substantially gel-free. A substantially gel-free product in the context of the invention contains no more than 0.5% by weight and preferably no more than 0.2% by weight of insoluble residue, based on the copolymer, after extraction for 24 hours with dichloromethane in a Soxleth extractor.

The content of copolymerized vinyl acetate is 30 to 90% by weight and preferably 40 to 80% by weight.

The copolymers produced by the process according to the invention have a Mooney viscosity of 10 to 80, preferably 20 to 60 and, more preferably, 20 to 40 (as determined in accordance with DIN 53523, ML 1+4 (100° C.)).

The melt flow index (MFI) of the copolymers produced by the process according to the invention is in the range from 0.1 to 3.0 g/10 mins. and preferably in the range from 0.5 to 2.0 g/10 mins. (as determined in accordance with DIN 53735, MFI 190/2.16).

The short-chain branching of the copolymers produced by the process according to the invention is from 5 to 50, preferably from 5 to 25 and more preferably from 5 to 17 methyl groups per 1,000 $C_2$ units of the main polymer chain (as determined by $^1$H-NMR).

The polymerization according to the invention is carried out in solution in the presence of preferably 30 to 40% by weight tert.butanol, based on the reaction solution. The reaction solution is made up of the vinyl acetate used, the ethylene used, the tert.butanol used and the azo compound used.

The process according to the invention is preferably at temperatures in the range from 55° to 70° C. and under pressures of 350 to 400 bar.

The following are preferably used as azo compounds which act as an initiator: 2,2'-azobis-(2,4-dimethyl valeronitrile), 2,2'-azobis-(2,4-dimethyl-4-methoxyvaleronitrile), 2,2'-azobis-(2,4,4-trimethyl valeronitrile), 1,1'-azobis-(cyclooctane carbonitrile), 1,1'-azobis-(cyclohexane carbonitrile), 2,2'-azobis-(isobutyronitrile) and/or 2,2'-azobis-(isobutyric acid methyl ester).

Particularly preferred azo compounds are 2,2'-azobis-(2,4-dimethyl valeronitrile), 2,2'-azobis-(2,4-dimethyl-4-methoxyvaleronitrile) and/or 2,2'-azobis-(isobutyronitrile).

Of these azo compounds, 2,2'-azobis-(2,4-dimethyl valeronitrile) is most particularly preferred.

The azo compounds are generally used in quantities of 0.005 to 0.1% by weight and preferably in quantities of 0.01 to 0.07% by weight, based on the reaction solution.

The cascade of stirred reactors used in accordance with the invention consists of 2 to 10 and preferably 4 to 6 reactors. The temperature of the reactor cascade is controlled in such a way that the same amount of initiator (azo compound) used decomposes in each reactor. In the process according to the invention, the residence time of the reaction solution in the reactor cascade is selected in such a way that the reaction solution issuing from the last reactor contains hardly any initiator (azo compound), i.e. the content of azo compound should be below 5% by weight, based on the azo compound used.

In one preferred embodiment of the process according to the invention (6 reactors), 35.5% by weight of tert.butanol, 35.2% by weight of vinyl acetate, 29.3% by weight of ethylene and 0.03% by weight of 2,2'-azobis-(2,4-dimethyl valeronitrile) are introduced with stirring into the first reactor. The temperatures in the reactors are 62° C. (first reactor), 58° C. (second reactor), 63° C. (third reactor), 65° C. (fourth reactor), 67° C. (fifth reactor) and 70° C. (sixth reactor). The pressure in all the reactors is approximately 370 bar. The average residence time is adjusted to 8 hours while the conversion, based on the vinyl acetate used, is of the order of 60%. The ethylene/vinyl acetate copolymer obtained has a vinyl acetate content of 60% by weight, a Mooney viscosity of 30 MU and an MFI of 1.5. Its molecular weight distribution Mw/Mn is 3. It has a short-chain branching of 14 $CH_3$ groups per 1,000 $C_2$ units.

In the process according to the invention, addition of the ethylene may be divided up. Around 70 to 90% of the ethylene to be used is advantageously introduced into the first reactor, the rest of the ethylene to be used being introduced into one or more of the following reactors.

The ethylene/vinyl acetate copolymer obtained by the process according to the invention may be vulcanized in known manner, for example using peroxides or high-energy radiation. The vulcanizates obtained are distinguished from vulcanizates produced hitherto by particularly high tensile strength and elongation at break, a high modulus value and tear propagation resistance and a low compression set.

The copolymers produced in accordance with the invention may be used in unvulcanized form or in vulcanized form. Preferred examples of their use in unvulcanized form include their application as flow improvers for lubricants and hydraulic oils (such as for example middle distillates according to DIN 7728 T1), as adhesive binders, particularly for hotmelt adhesives, and as a (plasticizing) mixture component for thermoplastics, thermosets and rubbers.

The quantities used are determined by the application envisaged. Thus, flow improvers may contain the copolymers produced in accordance with the invention in quantities of 1% by weight to 10% by weight.

Suitable thermoplastics and thermosets are, for example, PVC, polymethyl methacrylate, styrene and acrylonitrile copolymers, including ABS, polyvinylidene chloride, cellulose esters, polyesters including polycarbonates, polyamides, polyvinyl acetates, polyphenylene sulfide, polyethylene and thermoplastic polyesters, such as polyalkylene terephthalates; unsaturated polyester resins, phenol/formaldehyde and amine/formaldehyde condensates.

For most applications, the copolymers produced in accordance with the invention are used in vulcanized form. Vulcanization may be carried out, optionally after addition of fillers, stabilizers, etc., by crosslinking with peroxides and with polyfunctional, crosslinking compounds such as, for example, triallyl cyanurate, triallyl isocyanurate, bis-maleic imides or divinyl benzene.

An important use of vulcanizates produced from the copolymers obtained in accordance with the invention is as a mixture component for other rubbers such as, for example, rubber-like homopolymers and copolymers of butadiene, isoprene, chloroprene, acrylonitrile, vinyl acetate, esters of acrylic or methacrylic acid and $C_{1-8}$ monoalcohols or dialcohols; vinyl chloride, ethylene propylene. For these purposes, the copolymers produced in accordance with the invention may be used in quantities variable within broad limits, for example from 1 to 99% by weight, preferably from 10 to 90% by weight and more preferably from 10 to 40% by weight and from 60 to 90% by weight, based on the mixture.

The already vulcanized copolymers may be added, although the copolymers are generally added in unvulcanized form to the unvulcanized rubbers and the two components are then vulcanized together.

The last embodiment may be applied to mixtures of the copolymers produced in accordance with the invention with thermoplastics, for example with ethylene/vinyl acetate copolymers having VA contents of 1 to less than 30% by weight.

The copolymers produced in accordance with the invention may be used as such or in the form of the above-described mixtures for the production of vulcanized moldings, films and coatings of all kinds, for example for the production of cable sheaths, conductive cable layers, insulations, conveyor belts, power transmission elements, tubes, seals, bellows, floor coverings and vibration dampers.

The following Examples are intended to illustrate the process according to the invention without limiting it in any way.

EXAMPLES

A) Production of Ethylene/Vinyl Acetate Copolymers

The reaction parameters and crude polymer data of ethylene/vinyl acetate copolymers corresponding to the prior art are described in Examples 1 to 5 of Table 1 (Comparison Examples).

The reaction parameters and crude polymer data of ethylene/vinyl acetate copolymers produced by the process according to the invention are described in Examples 6 to 12 of Table 1.

TABLE 1

Reaction parameters and crude polymer data

| Ex. No. | Bayer ethylene/ vinyl acetate co- polymers (EVM type) | 1) t-BuOH (% by wt) | 2) E/VA | 1,3) ADVN or tBpp (% by wt) | 4) V (m3) | 5) t (h) | Reactor temperatures (°C.) | | | | | |
|---|---|---|---|---|---|---|---|---|---|---|---|---|
| | | | | | | | 7 | 8 | 9 | 10 | 11 | 12 |
| 1* | L 450 HV | 44.0 | 1.25 | 0.045 | 32 | 8.6 | 60 | 65 | 70 | 70 | 75 | 90 |
| 2* | L 500 HV | 47.0 | 1.0 | 0.055 | 32 | 8.5 | 60 | 65 | 65 | 70 | 70 | 90 |
| 3* | KA 8385 | 36.5 | 0.75 | 0.020 | 26 | 7.6 | 60 | 65 | 70 | 75 | — | 90 |
| 4* | L 700 HV | 42.0 | 0.39 | 0.020 | 28 | 7.2 | — | 60 | 65 | 65 | 65 | 90 |
| 5* | KA 8579 | 45.5 | 0.20 | 0.017 | 20 | 6.3 | 60 | 63 | — | 67 | — | 85 |
| 6 | KA 8507 | 37.0 | 1.45 | 0.060 | 32 | 9.0 | 64 | 62 | 66 | 67 | 68 | 70 |
| 7 | KA 8608 | 35.5 | 1.25 | 0.035 | 26 | 8.6 | 64 | — | 60 | 64 | 69 | 75 |
| 8 | KA 8609 | 35.5 | 0.83 | 0.030 | 28 | 9.1 | — | 57 | 58 | 65 | 69 | 70 |
| 9 | KA 8605 | 35.5 | 0.75 | 0.030 | 32 | 8.0 | 62 | 58 | 63 | 65 | 66 | 70 |
| 10 | KA 8645 | 35.0 | 0.43 | 0.025 | 32 | 8.0 | 63 | 59 | 64 | 66 | 67 | 70 |
| 11 | KA 8479 | 36.0 | 0.20 | 0.020 | 32 | 8.0 | 62 | 57 | 64 | 65 | 68 | 70 |
| 12 | — | 36.5 | 1.25 | 0.050 | 32 | 9.0 | 64 | 58 | 64 | 62 | 66 | 70 |

| Ex, No. | 6) P (bar) | 7) Conversion VA (%) | 8) VA(p) (% by wt) | Gel (% by wt) | ML1 + 4 (100° C.) (MU) | MFI 190/2.16 (g/10 mins) | 9) Mw/ Mn | 10) SCB (CH3/ 1000U) |
|---|---|---|---|---|---|---|---|---|
| 1* | 320 | 60 | 45 | 0.83 | 27 | 1.3 | 17 | 30 |
| 2* | 320 | 60 | 50 | 0.61 | 27 | 1.3 | 15 | 36 |
| 3* | 320 | 50 | 60 | 0.64 | 27 | 2.0 | 8 | 23 |
| 4* | 320 | 60 | 70 | 0.57 | 27 | 2.9 | 9 | 19 |
| 5* | 320 | 60 | 80 | 0.42 | 27 | 4.7 | 4 | 31 |
| 6 | 370 | 50 | 45 | 0.20 | 30 | 0.8 | 3 | 15 |
| 7 | 370 | 55 | 50 | 0.13 | 30 | 1.1 | 3 | 14 |
| 8 | 370 | 60 | 60 | 0.16 | 30 | 1.5 | 3 | 14 |

TABLE 1-continued

| | | | Reaction parameters and crude polymer data | | | | | |
|---|---|---|---|---|---|---|---|---|
| 9  | 370 | 60 | 63 | 0.20 | 30 | 1.3 | 4 | 16 |
| 10 | 370 | 60 | 70 | 0.11 | 30 | 1.4 | 3 | 14 |
| 11 | 370 | 60 | 80 | 0.10 | 30 | 1.6 | 4 | 17 |
| 12 | 370 | 55 | 50 | 0.15 | 37 | 0.2 | 4 | 15 |

1) Feed streams, based on the reaction solution
2) Ratio of the monomer feed streams
3) Examples 1 to 5: tert.butyl perpivalate tBPP; Examples 6 to 11: 2,2'-azobis-(2,4-dimethyl valeronitrile) ADVN
4) Cascade volume
5) Average residence time
6) Reaction pressure
7) Conversion, based on vinyl acetate
8) Polymeric vinyl acetate in the product
9) Polydispersity
10) Short chain branching: methyl groups per 1000 C2 units
*Comparison Examples B) Vulcanization of the Ethylene/Vinyl Acetate Copolymers All the ethylene/vinyl acetate copolymers described in the Examples were mixed with the following constituents in a laboratory internal mixer:

| | | |
|---|---|---|
| Levapren ® (Bayer) | 100 phr | (rubber) |
| Corax ® N 550 (Degussa) | 40 phr | (carbon black) |
| Rhenovin ® DDA 70 (Rheinchemie) | 1.5 phr | (antiager: diphenyl amine) |
| Stearic acid | 1.0 phr | (processing aid) |
| Rhenofit ® TAC/s (Rheinchemie) | 3.5 phr | (activator: triallyl cyanurate) |
| Perkadox ® 14/40 (Akzo) | 4.0 phr | (peroxide: bis-(tert. butyl peroxyisopropyl)-benzene) |

The mixtures are vulcanized under pressure (200 bar) in a press (170° C./20 mins.) to form 2 mm thick sheets. The necessary test specimens are stamped out from the sheets. All the tests applied correspond to the relevant ASTM parameters.

The mechanical data of EVM vulcanizates corresponding to the prior art are described in Examples 1 to 5 of Table 2.

The mechanical data of EVM vulcanizates obtained by the process according to the invention are described in Examples 6 to 12 of Table 2.

TABLE 2

| | | | Ring | | | | | | 6) | 7) |
|---|---|---|---|---|---|---|---|---|---|---|
| Ex. | EVM type | VA(p) (% by wt) | 1) TS (mPa) | 2) E (%) | 3) M100 (mPa) | 4) S150 (mPa) | 5) H23° C. (Shore A) | 5) H70° C. (Shore A) | TPR DIN 53515 (N/mm) | R23° C. (%) |
| 1* | L 450 HV | 45 | 14 | 195 | 5.8 | 11.8 | 71 | 64 | 8.5 | 43 |
| 2* | L 500 HV | 50 | 15 | 210 | 4.9 | 10.9 | 64 | 60 | 7.0 | 35 |
| 3* | KA 8385 | 60 | 14 | 200 | 5.5 | 11.3 | 68 | 63 | 8.0 | 30 |
| 4* | L 700 HV | 70 | 15 | 200 | 7.0 | 12.5 | 71 | 59 | 10.0 | 16 |
| 5* | KA 8479 | 80 | 16 | 190 | 8.2 | 14.7 | 81 | 57 | 10.5 | 8 |
| 6  | KA 8507 | 45 | 17 | 210 | 6.5 | 12.6 | 74 | 65 | 9.5 | 44 |
| 7  | KA 8608 | 50 | 18 | 225 | 6.0 | 12.5 | 69 | 65 | 8.0 | 40 |
| 8  | KA 8609 | 60 | 17 | 225 | 5.9 | 12.0 | 69 | 63 | 8.5 | 30 |
| 9  | KA 8605 | 63 | 18 | 230 | 6.1 | 12.1 | 68 | 63 | 8.0 | 26 |
| 10 | KA 8645 | 70 | 17 | 230 | 7.5 | 12.9 | 68 | 62 | 10.5 | 15 |
| 11 | KA 8479 | 80 | 17 | 210 | 9.0 | 15.7 | 79 | 63 | 11.0 | 5 |
| 12 | — | 50 | — | — | — | — | 75 | 64 | 9.5 | 38 |

| | Bar II | | | | 8) | 8) |
|---|---|---|---|---|---|---|
| Ex. | 1) TS (mPa) | 2) E (%) | 3) M100 (mPa) | 5) H23° C. (Shore A) | CS23° C. 70 h (%) | CS150° C. 70 h (%) |
| 1* | 17 | 200 | 6.6 | 72 | 27 | 21 |
| 2* | 17 | 215 | 5.6 | 63 | 13 | 28 |
| 3* | 18 | 215 | 6.5 | 67 | 9 | 26 |
| 4* | 18 | 225 | 7.9 | 69 | 11 | 27 |
| 5* | 19 | 225 | 9.0 | 80 | 28 | 26 |
| 6  | 20 | 210 | 7.5 | 74 | 30 | 21 |
| 7  | 20 | 230 | 6.8 | 67 | 15 | 24 |
| 8  | 20 | 235 | 6.7 | 68 | 9 | 25 |
| 9  | 20 | 235 | 6.5 | 67 | 8 | 24 |

TABLE 2-continued

| | Vulcanizate data | | | | | | |
|---|---|---|---|---|---|---|---|
| 10 | 20 | 240 | 8.2 | 69 | 10 | 24 |
| 11 | 20 | 240 | 9.5 | 80 | 25 | 24 |
| 12 | 22 | 205 | 8.7 | 75 | 29 | 23 |

1) Tensile strength
2) Elongation at break
3) Modulus at 150% elongation
4) Modulus at 100% elongation
5) Hardness
6) Tear propagation resistance
7) Rebound resilience
8) Compression set
*Comparison Examples

We claim:

1. A process of preparing ethylene/vinyl acetate copolymers consisting of producing gel-free ethylene/vinyl acetate copolymers having 30–90% copolymerized vinyl acetate and a Mooney viscosity of 10–80 by polymerizing ethylene and vinyl acetate in a solution which is free of other monomers and which contains 20–45% by weight, based on weight of solution, of tert.-butanol, in the presence of an azo initiator, at temperatures of 50°–80° C. and under pressures of 300 to 450 bar, in a cascade of stirred reactors with an average residence time of the solution in the reactor cascade of 5–9 hours and a conversion of 50–70% by weight, based on vinyl acetate used.

2. The process of claim 1, wherein the polymerized vinyl acetate content is 40–80% by weight and the Mooney viscosity is 20–40.

3. The process as claimed in claim 1, wherein the azo initiator is 2,2'-azobis-(2,4-dimethylvaleronitrile).

* * * * *